(12) United States Patent
Coman et al.

(10) Patent No.: US 10,997,606 B1
(45) Date of Patent: May 4, 2021

(54) SYSTEMS AND METHODS FOR AUTOMATED DISCREPANCY DETERMINATION, EXPLANATION, AND RESOLUTION

(71) Applicant: Capital One Services, LLC, McLean, VA (US)

(72) Inventors: Alexandra Coman, Tysons Corner, VA (US); Erik Mueller, Chevy Chase, MD (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/662,707

(22) Filed: Oct. 24, 2019

(51) Int. Cl.
| | |
|---|---|
| *G06Q 30/06* | (2012.01) |
| *G06Q 30/00* | (2012.01) |
| *G10L 15/22* | (2006.01) |
| *G06N 20/00* | (2019.01) |
| *H04M 3/51* | (2006.01) |

(52) U.S. Cl.
CPC ......... *G06Q 30/016* (2013.01); *G06N 20/00* (2019.01); *G10L 15/22* (2013.01); *H04M 3/5183* (2013.01)

(58) Field of Classification Search
None
See application file for complete search history.

(56) References Cited

U.S. PATENT DOCUMENTS

| | | | |
|---|---|---|---|
| 2016/0078149 A1* | 3/2016 | Gaucher | G06F 16/90332 704/235 |
| 2017/0330196 A1* | 11/2017 | Larko | G06Q 30/016 |
| 2017/0359464 A1 | 12/2017 | Segalis et al. | |
| 2018/0220000 A1 | 8/2018 | Segalis et al. | |
| 2018/0227416 A1 | 8/2018 | Segalis et al. | |
| 2018/0227417 A1 | 8/2018 | Segalis et al. | |
| 2018/0227418 A1 | 8/2018 | Segalis et al. | |
| 2018/0261203 A1* | 9/2018 | Zoller | G06F 40/284 |
| 2019/0066013 A1* | 2/2019 | Gupta | G06N 3/006 |
| 2019/0164159 A1* | 5/2019 | Ponniah | G06K 9/6282 |
| 2019/0227822 A1* | 7/2019 | Azmoon | G06Q 30/016 |
| 2020/0013411 A1* | 1/2020 | Kumar | G10L 17/24 |
| 2020/0120210 A1* | 4/2020 | Viegas | G06F 16/243 |

* cited by examiner

*Primary Examiner* — Jan P Mincarelli
(74) *Attorney, Agent, or Firm* — Troutman Pepper Hamilton Sanders LLP; Christopher J. Forstner; John A. Morrissett

(57) ABSTRACT

Systems and methods are provided herein for autonomously determining and resolving a customer's perceived discrepancy during a customer service interaction. The method can include receiving an incoming communication from a customer; extracting, by a Natural Language Processing (NLP) device, a perceived state and an expected state of a product or service based on the incoming communication; determining by a discrepancy determination device, a discrepancy between the perceived and expected state of the product or service; verifying, by a rule-based platform, the discrepancy; generating a response based on the discrepancy, the response comprising one or more of: a fact pattern response related to the perceived discrepancy and a confirmation or correction of a verified discrepancy; and outputting, for presentation to the customer, the response.

19 Claims, 6 Drawing Sheets

SYSTEMS AND METHODS FOR AUTOMATED DISCREPANCY DETERMINATION, EXPLANATION, AND RESOLUTION

FIELD

The disclosed technology relates to autonomously determining and responding to a customer's perceived discrepancy during an automated customer service interaction.

BACKGROUND

Customer service agents, whether human or artificial intelligence (AI), often receive requests for explanations regarding products and services. For example, the following request for an explanation related to a shipping charge discrepancy may be received from a customer: "Why was I charged for shipping? I spent more than $100!" Such a request may be an expression of perceived discrepancies between a state that was expected by the customer (the expected state) and a state that the customer says or implies they observed (the perceived state). For example, the utterance: "Why was I charged $5 for shipping? I thought shipping would be free!" expresses a discrepancy between (1) the perceived state that the customer was charged $5 for shipping on an order, and (2) the expected state that shipping would be free on that order. In these customer service situations, the expected state is generally more desirable to the customer than the perceived state, creating friction.

Accordingly, there is a need for improved, automated customer-service systems that can autonomously determine and resolve a customer's perceived discrepancy during an automated customer service interaction. Embodiments of the present disclosure are directed to this and other considerations.

SUMMARY

Disclosed herein are systems and methods for autonomously determining and resolving a customer's perceived discrepancy during an automated customer service interaction.

Consistent with the disclosed embodiments, a computer-implemented method is provided for autonomously determining and resolving a customer's perceived discrepancy during a customer service interaction. The method can include receiving, by a call center server, an incoming communication from a customer; extracting, by a Natural Language Processing (NLP) device in communication with the call center server, a perceived state and an expected state related to a product or service based on the received communication; determining, based on the extracted states, and by a processor of a discrepancy determination device, a discrepancy between the perceived state and the expected state; verifying, by a rule-based platform of the discrepancy determination device, the discrepancy; generating, by the processor of the discrepancy determination device, response-modifying commands that program the NLP device to generate a response based on the discrepancy; generating, by the NLP device, and based on the response-modifying commands, the response comprising one or more of: a fact pattern response related to the discrepancy, and a confirmation or correction response related to the discrepancy; and outputting, for presentation to the customer, the generated response. A fact pattern response is defined as a collection of facts provided in a response. The fact pattern response, for example, may include order history details, a listing of recent orders, dates, shipping charges, etc.

Consistent with the disclosed embodiments, another computer-implemented method is provided for autonomously determining and resolving a customer's perceived discrepancy during a customer service interaction. The method can include receiving, by a call center server, an incoming communication from a customer; extracting, by a Natural Language Processing (NLP) device in communication with the call center server, a perceived state, an expected state, and/or other assertions related to a product or service based on the incoming communication; determining, by a processor of a discrepancy determination device, a discrepancy between the perceived and expected state; verifying, by a rule-based platform of the discrepancy determination device, one or more of the discrepancy and the zero or more assertions; generating, by the processor of the discrepancy determination device, response-modifying commands that program the NLP device to generate a response based on the discrepancy and the zero or more assertions; generating, by the NLP device, and based on the response-modifying commands, the response comprising one or more of: a fact pattern response related to the perceived discrepancy; and a confirmation or correction response related to the perceived discrepancy for a verifiable assertion; and outputting, for presentation to the customer, the response. A verifiable assertion is an assertion that the system can verify based on information immediately at its disposal or obtainable from other systems.

Consistent with the disclosed embodiments, a system is provided for determining and resolving a customer's perceived discrepancy during a customer service interaction. The system can include: one or more processors; a discrepancy determination device; a rule-based platform; an NLP device; a machine learning module; and memory in communication with the one or more processors and storing instructions that, when executed by the one or more processors, cause the system to: receive an incoming communication from a customer; extract, by the NLP device, a perceived state, an expected state, and/or other assertions related to a product or service based on the incoming communication; determine, based on the perceived state and the expected state, and by the discrepancy determination device, a discrepancy between the perceived and expected state related to the product or service; verify, by a rule-based platform, the discrepancy; generate, by the machine learning module, a response based on the discrepancy, the response comprising one or more of: a fact pattern response related to the perceived discrepancy; and a confirmation and/or correction of the discrepancy and/or one or more assertions; refine one or more of the rule-based platform and the machine learning module based on intermediary process monitoring of the response; and output, for presentation to the customer, the response.

Further features of the disclosed design, and the advantages offered thereby, are explained in greater detail hereinafter with reference to specific embodiments illustrated in the accompanying drawings, wherein like elements are indicated by like reference designators.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings.

DETAILED DESCRIPTION

Figure 1:
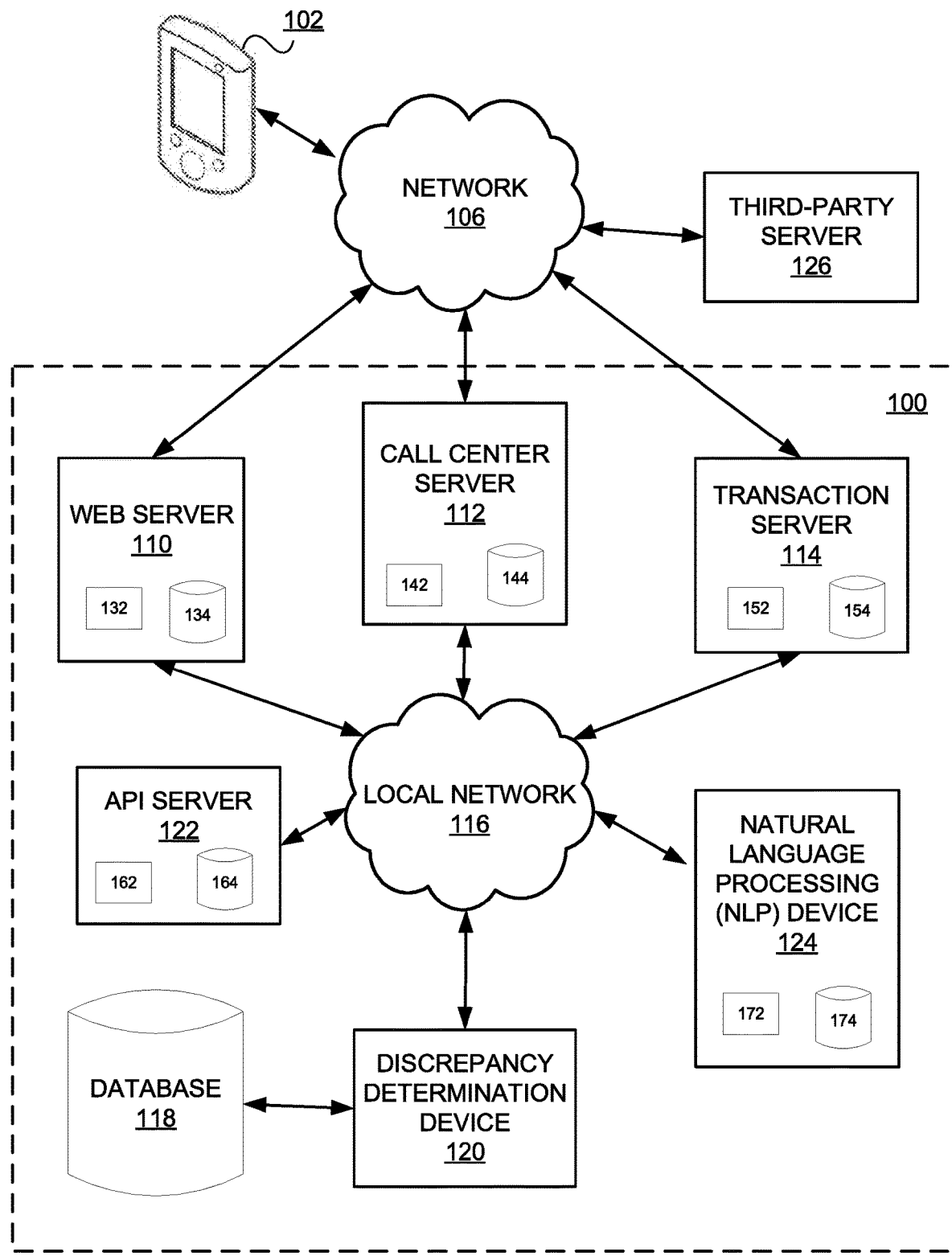
FIG. 1 is a block diagram of an example system 100 that may be used to autonomously determine and resolve a customer's perceived discrepancy during an automated customer service interaction.

According to certain example implementations of the disclosed technology, systems and methods are disclosed herein for autonomously determining and/or resolving a customer's perceived discrepancy during an automated customer service interaction based on an utterance received from the customer and/or a machine-based dialogue with the customer. For example, in one aspect, a system is provided for autonomously receiving and interpreting a customer's utterance to determine, using a discrepancy determination device, whether such communication from the customer includes an expression that signifies an expected and/or perceived state.

The discrepancy determination device may access one or more databases to retrieve details related to the customer including, but not limited to, order history, shipment tracking, proof of delivery, billing information, etc. In certain implementations, the discrepancy determination device may further retrieve rules from a rule-based platform that may be utilized to verify, confirm, and/or dispute the perceived discrepancy and/or one or more assertions. For example, the rule-based platform may include pertinent information related to normal and/or special procedures for shipping pricing, date ranges for special offers, prerequisites for special pricing, etc. that may be compared with the customer's assertions for generating an appropriate response and/or for modifying a stock response.

In certain implementations, the discrepancy determination device may prepare dialog modifying commands based on the detected discrepancy, assertions, customer and/or order history data available to the system, and/or associated rules from the rule-based platform. The discrepancy determination device may use such dialog modifying commands to program a natural language processing (NLP) device to, for example, modify a response with details related to the customer's communication. The dialog modifying commands, for example, may be utilized by the NLP device to generate/revise a natural language response that can include: a request for verification of certain details related to the customer's communication, a confirmation of a detected assertion, a confirmation and/or correction of a verified discrepancy, a response disputing one or more detected assertions, a response disputing a perceived discrepancy, a request for additional information from the customer regarding the perceived discrepancy, etc. Such interactions may be carried out by the systems and methods disclosed herein without involving a human customer service agent. Accordingly, the discrepancy determination device may program the NLP device and may use feedback received from the customer to further revise or update the dialog modifying commands in an iterative manner.

In addition to questions received from the customer, certain assertions can also function as requests for explanation from the customer and may include expressions of perceived discrepancies. "I was charged for shipping!!!", for example, can reasonably be understood to imply that the customer expected not to be charged for shipping and would like an explanation or resolution of that occurrence.

In an utterance, the customers may provide an argument for why the perceived state is incorrect and the expected state is correct. In such a case, the system may identify the argument, the assertions of the argument, and the reasoning of the argument, and the system may verify the assertions and the correctness of the reasoning. Utterances could include, for example, an assertion that, in the customer's perception, contradicts the validity of the perceived state. Utterances of this type may include or imply the phrase "given that". For example, the utterance: "Why was I charged for shipping? I spent more than $100!" could be rewritten as "Why was I charged for shipping, given that I spent more than $100?" More broadly, such an argument may include more than one assertion and can describe the context surrounding the discrepancy to a greater extent. Such arguments can be story-like, arbitrarily long, and may contain multiple assertions and complex reasoning. For utterances that do not include such an argument, a full, correct explanation could be very broad, including various possible factors leading to the perceived state.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

FIG. 1 is a block diagram of an example system 100 that may be used to autonomously determine and respond to a customer's perceived discrepancy. The system 100 may be configured to perform one or more processes that can adaptively generate responses based on an evolving context associated with customer interactions, orders, goods, services, etc. The components and arrangements shown in FIG. 1 are not intended to limit the disclosed embodiments as the components used to implement the disclosed processes and features may vary. As shown, system 100 may interact with a user device 102 via a network 106. In certain example implementations, the system 100 may include a web server 110, a call center server 112, a transaction server 114, a local network 116, a discrepancy determination device 120, a database 118, an API server 122, and an NLP server 124 (which may be referred to herein as an NLP device).

In some embodiments, a customer may operate the user device 102. The user device 102 can include one or more of a mobile device, smart phone, general purpose computer, tablet computer, laptop computer, telephone, PSTN landline, smart wearable device, voice command device, other mobile computing device, or any other device capable of communicating with the network 106 and ultimately communicating with one or more components of the system 100. In some embodiments, the user device 102 may include or incorporate electronic communication devices for hearing or vision impaired users.

Customers may include individuals such as, for example, subscribers, clients, prospective clients, or customers of an entity associated with an organization, such as individuals who have obtained, will obtain, or may obtain a product, service, or consultation from an entity associated with the system 100. According to some embodiments, the user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

The network 106 may be of any suitable type, including individual connections via the internet such as cellular or WiFi networks. In some embodiments, the network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 106 may include any type of computer networking arrangement used to exchange data. For example, the network 106 may be the Internet, a private data network, virtual private network using a public network, and/or other suitable connection(s) that enable(s) components in the system 100 environment to send and receive information between the components of the system 100. The network 106 may also include a public switched telephone network ("PSTN") and/or a wireless network.

In accordance with certain example implementations, a third-party server 126 may be in communication with the system 100 via the network 106. In certain implementations, the third-party server 126 can include a computer system associated with an entity (other than the entity associated with the system 100 and its customers) that performs one or more functions associated with the customers. For example, the third-party server 126 can include an automated teller machine (ATM) system that allows a customer to withdraw money from an account managed via an organization that controls the system 100. As another example, the third-party server 126 may include a computer system associated with a product repair service that submits a warranty claim for a product that a customer purchased from the organization that controls the system 100.

The system 100 may be associated with and optionally controlled by an entity such as a business, corporation, individual, partnership, or any other entity that provides one or more of goods, services, and consultations to individuals such as customers. The system 100 may include one or more servers and computer systems for performing one or more functions associated with products and/or services that the organization provides. Such servers and computer systems may include, for example, the web server 110, the call center server 112, and/or the transaction server 114, as well as any other computer systems necessary to accomplish tasks associated with the organization or the needs of customers (which may be customers of the entity associated with the organization). The web server 110 may include a computer system configured to generate and provide one or more websites accessible to customers, as well as any other individuals involved in organization's normal operations. The web server 110, for example, may include a computer system configured to receive communications from the user device 102 via for example, a mobile application, a chat program, an instant messaging program, a voice-to-text program, an SMS message, email, or any other type or format of written or electronic communication. The web server 110 may have one or more processors 132 and one or more web server databases 134, which may be any suitable repository of website data. Information stored in the web server 110 may be accessed (e.g., retrieved, updated, and added to) via the local network 116 (and/or the network 106) by one or more devices (e.g., the discrepancy determination device 120 and/or the NLP device 124) of the system 100. In some embodiments, one or more processors 132 may be used to implement an automated natural language dialogue system that may interact with a customer via different types of communication channels such as a website, mobile application, instant messaging application, SMS message, email, or any other type of electronic communication. When receiving an incoming message from, for example, the user device 102 of a customer, the web server 110 may be configured to determine the type of communication channel the user device 102 used to generate the incoming message.

The call center server 112 may include a computer system configured to receive, process, and route telephone calls and other electronic communications between a customer operating a user device 102 and the discrepancy determination device 120. The call center server 112 may have one or more processors 142 and one or more call center databases 144, which may be any suitable repository of call center data. Information stored in the call center server 112 may be accessed (e.g., retrieved, updated, and added to) via the local network 116 (and/or network 106) by one or more devices of the system 100. In some embodiments, the call center server processor 142 may be used to implement an interactive voice response (IVR) system that interacts with the customer over the phone.

The transaction server 114 may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, shipping information, delivery information, and any other type of transaction associated with the products and/or services that an entity associated with system 100 provides to individuals such as customers. The transaction server 114 may have one or more processors 152 and one or more transaction server databases 154, which may be any suitable repository of transaction data. Information stored in transaction server 114 may be accessed (e.g., retrieved, updated, and added to) via the local network 116 (and/or network 106) by one or more devices of the system 100.

In some embodiments, the transaction server 114 tracks and stores event data regarding interactions between a third-party, such as a third-party server 126, with the system 100, and on behalf of the individual customers. For example, the transaction server 114 may track third-party interactions such as purchase requests, refund requests, shipping status, shipping charges, warranty claims, account withdrawals and deposits, and any other type of interaction that the third-party server 126 may conduct with the system 100 on behalf of an individual such as customer.

The local network 116 may include any type of computer networking arrangement used to exchange data in a localized area, such as WiFi, Bluetooth™ Ethernet, and other suitable network connections that enable components of the system 100 to interact with one another and to connect to the network 106 for interacting with components in the system 100 environment. In some embodiments, the local network 116 may include an interface for communicating with or linking to the network 106. In other embodiments, certain components of the system 100 may communicate via the network 106, without a separate local network 116.

In accordance with certain example implementations of the disclosed technology, the discrepancy determination device 120, which is described more fully below with reference to FIG. 2, may include one or more computer systems configured to compile data from a plurality of sources, such as the web server 110, the call center server 112, the transaction server 114, and/or the database 118. The discrepancy determination device 120 may correlate compiled data, analyze the compiled data, arrange the compiled data, generate derived data based on the compiled data, and store the compiled and derived data in a database such as the database 118. According to some embodiments, the database 118 may be a database associated with an organization and/or a related entity that stores a variety of information relating to customers, transactions, and business operations. The database 118 may also serve as a back-up storage device and may contain data and information that is also stored on, for example, databases 134, 144, 154, 164, 174 (and 280, as will be discussed with reference to FIG. 2). The database 118 may be accessed by the discrepancy determination device 120 and may be used to store records of every interaction, communication, and/or transaction a particular customer has had with the organization 108 and/or its related entity in the past to enable the creation of an ever-evolving customer context that may enable the discrepancy determination device 120, in conjunction with the NLP device 124, to generate and provide interactions with the customer.

In certain example implementations, the API server 122 may include a computer system configured to execute one or more application program interfaces (APIs) that provide various functionalities related to the operations of the system 100. In some embodiments, the API server 122 may include API adapters that enable the API server 122 to interface with and utilize enterprise APIs maintained by an organization and/or an associated entity that may be housed on other systems or devices. In some embodiments, APIs can provide functions that include, for example, retrieving customer account information, modifying customer account information, executing a transaction related to an account, scheduling a payment, authenticating a customer, updating a customer account to opt-in or opt-out of notifications, and any other such function related to management of customer profiles and accounts. The API server 122 may include one or more processors 162 and one or more API databases 164, which may be any suitable repository of API data. Information stored in the API server 122 may be accessed (e.g., retrieved, updated, and added to) via the local network 116 (and/or network 106) by one or more devices (e.g., discrepancy determination device 120) of system 100. In some embodiments, the API processor 162 may be used to implement one or more APIs that can access, modify, and retrieve customer account information.

In certain embodiments, real-time APIs consistent with certain disclosed embodiments may use Representational State Transfer (REST) style architecture, and in this scenario, the real time API may be called a RESTful API.

In certain embodiments, a real-time API may include a set of Hypertext Transfer Protocol (HTTP) request messages and a definition of the structure of response messages. In certain aspects, the API may allow a software application, which is written against the API and installed on a client (such as, for example, the transaction server 114) to exchange data with a server that implements the API (such as, for example, the API server 122), in a request-response pattern. In certain embodiments, the request-response pattern defined by the API may be configured in a synchronous fashion and may require that the response be provided in real-time. In some embodiments, a response message from the server to the client through the API consistent with the disclosed embodiments may be in formats including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). In certain example implementations, the client may send GET and POST requests with JSON serialized parameters in the body. Preferably, the requests with JSON serialized parameters use "application/json" content-type. In another aspect, an API design may also require the server implementing the API return messages in JSON format in response to the request calls from the client.

In accordance certain example implementations of the disclosed technology, the NLP device 124 may include a computer system configured to receive and process incoming messages and determine a meaning of the incoming message. For example, the NLP device 124 may be configured to receive and execute commands (for example, from the discrepancy determination device 120) that instructs the NLP device 124 to determine the meaning of the incoming dialogue message. In certain example implementations, the discrepancy determination device 120 may issue dialog modifying commands to the NLP device 124, for example, that instruct the NLP device 124 to formulate/revise a response based on rules and/or determined information related to the customer interaction, specifics related to an order, etc. Thus, in certain example implementations, the discrepancy determination device 120 may program the NLP device 124.

As will be discussed further below (with reference to FIG. 3), the NLP device 124 may be configured to continuously or intermittently listen for and receive commands from a command queue to determine if there are any new commands directed to the NLP device 124. Upon receiving and processing an incoming dialogue message, the NLP device 124 may output the meaning of an incoming dialogue message in a format that other devices can process. For example, the NLP device 124 may receive an incoming message stating: "Why was I charged for shipping?" and may determine that this statement represents a request for an explanation related to a perceived discrepancy. The NLP device 124 may be configured to output an event representing the meaning of the incoming message to an event queue for processing by another device of the system 100. In some embodiments, the NLP device 124 may be configured to generate a natural language phrase in response to receiving a command. Accordingly, in some embodiments, the NLP device 124 may be configured to output an event that contains data representing natural language.

The NLP device 124 may include one or more processors 172 and one or more NLP databases 174, which may be any suitable repository of NLP data. Information stored in the NLP device 124 may be accessed (e.g., retrieved, updated, and added to) via the local network 116 (and/or network 106) by one or more devices (e.g., the discrepancy determination device 120) of system 100. In some embodiments, the NLP processor 172 may be used to implement an NLP system that can determine the meaning behind a string of text and convert it to a form that can be understood by other devices.

Although the preceding description describes various functions of the web server 110, the call center server 112, the transaction server 114, the discrepancy determination device 120, the database 118, the API server 122, and the NLP device 124, in some embodiments, some or all of these functions may be carried out by a single computing device.

For ease of discussion, embodiments may be described in connection with the generation of automated natural language dialogue in response to an electronic text communication such as an SMS message, chat program message, or an email. It is to be understood, however, that disclosed embodiments are not limited to discourse and/or dialogue in response to written electronic messages and may be used in many other contexts, such as, for example, generating automated natural language dialogue in response to an oral communication such as a phone call. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
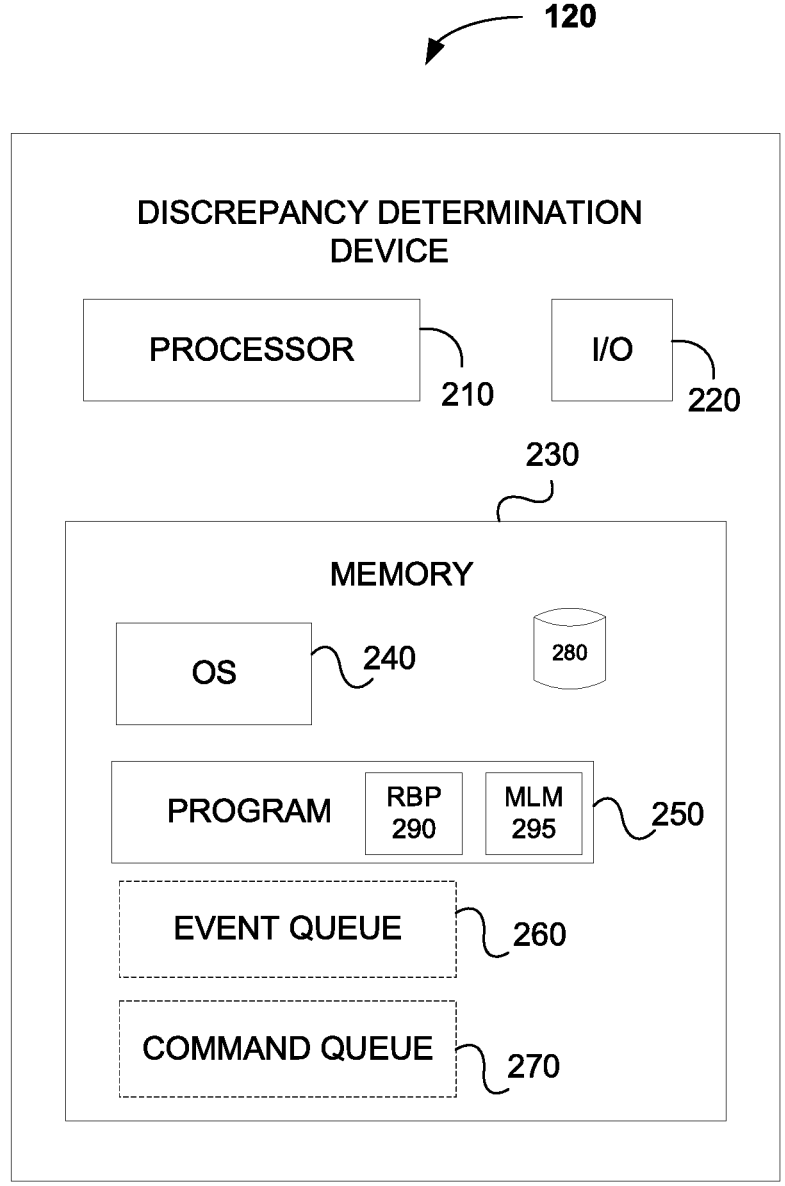
FIG. 2 is a block diagram of an example discrepancy determination device 120, as shown in FIG. 1 with additional details.

FIG. 2 is a block diagram (with additional details) of the example discrepancy determination device 120, as also depicted in FIG. 1. According to some embodiments, the user device 102, the web server 110, the call center server 112, the transaction server 114, the API server 122, the NLP device 124, and the third-party server 126, as depicted in FIG. 1, may have a similar structure and components that are similar to those described with respect to discrepancy determination device 120 shown in FIG. 2. As shown, the discrepancy determination device 120 may include a processor 210, an input/output ("I/O") device 220, a memory 230 containing an operating system ("OS") 240 and a program 250. In certain example implementations, the discrepancy determination device 120 may be a single server or may be configured as a distributed computer system including multiple servers or computers that interoperate to perform one or more of the processes and functionalities associated with the disclosed embodiments. In some embodiments, the discrepancy determination device 120 may further include a peripheral interface, a transceiver, a mobile network interface in communication with the processor 210, a bus configured to facilitate communication between the various components of the discrepancy determination device 120, and a power source configured to power one or more components of the discrepancy determination device 120.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 210 to communicate with other devices via wired or wireless networks, whether local or wide area, private or public, as known in the art. A power source may be configured to provide an appropriate alternating current (AC) or direct current (DC) to power components.

The processor 210 may include one or more of a microprocessor, microcontroller, digital signal processor, co-processor or the like or combinations thereof capable of executing stored instructions and operating upon stored data. The memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 230.

The processor 210 may be one or more known processing devices, such as, but not limited to, a microprocessor from the Pentium™ family manufactured by Intel™ or the Turion™ family manufactured by AMD™. The processor 210 may constitute a single core or multiple core processor that executes parallel processes simultaneously. For example, the processor 210 may be a single core processor that is configured with virtual processing technologies. In certain embodiments, the processor 210 may use logical processors to simultaneously execute and control multiple processes. The processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the discrepancy determination device 120 may include one or more storage devices configured to store information used by the processor 210 (or other components) to perform certain functions related to the disclosed embodiments. In one example, the discrepancy determination device 120 may include the memory 230 that includes instructions to enable the processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, the discrepancy determination device 120 may include a memory 230 that includes instructions that, when executed by the processor 210, perform one or more processes consistent with the functionalities disclosed herein. Methods, systems, and articles of manufacture consistent with disclosed embodiments are not limited to separate programs or computers configured to perform dedicated tasks. For example, the discrepancy determination device 120 may include the memory 230 that may include one or more programs 250 to perform one or more functions of the disclosed embodiments. For example, in some embodiments, the discrepancy determination device 120 may additionally manage dialogue and/or other interactions with the customer via a program 250.

In certain example implementations, the program 250 that may include a rule-based platform 290 for generating zero or more commands in response to processing an event in accordance with a set of predefined rules. In some embodiments, the discrepancy determination device 120 may include a trained machine learning model 295 for generating zero or more commands in response to processing an event, in accordance with a model that may be continuously or intermittently updated. Moreover, the processor 210 may execute one or more programs 250 located remotely from the system 100 (such as the system shown in FIG. 1). For example, the system 100 may access one or more remote programs 250 (such as the rule-based platform 290 or the trained machine learning model 295), that, when executed, perform functions related to disclosed embodiments.

The memory 230 may include one or more memory devices that store data and instructions used to perform one or more features of the disclosed embodiments. The memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 230 may include software components that, when executed by the processor 210, perform one or more processes consistent with the disclosed embodiments. In some embodiments, the memory 230 may include a customer information database 280 for storing related data to enable the discrepancy determination device 120 to perform one or more of the processes and functionalities associated with the disclosed embodiments.

The customer information database 280 may include stored data relating to a customer profile and customer accounts, such as for example, customer identification, name, age, sex, birthday, address, account status, preferences, preferred language, greeting name, preferred communication channel, account numbers, order history, delivery history, authorized users associated with one or more accounts, account balances, account payment history, and other such typical account information. The customer information database 280 may further include stored data relating to previous interactions between the organization (or its related entity) and a customer. For example, the customer information database 280 may store customer interaction data that includes records of previous customer service interactions with a customer via a website, SMS, a chat program, a mobile application, an IVR system, or notations taken after speaking with a customer service agent. The customer information database 280 may also include information about business transactions between the organization (or its related entity) and a customer that may be obtained from, for example, the transaction server 114.

The customer information database 280 may also include customer feedback data such as an indication of whether an automated interaction with a customer was successful, online surveys filled out by a customer, surveys answered by a customer following previous interactions to the company, digital feedback provided through websites or mobile applications associated with the organization or its related entity (e.g., selecting a smiley face or thumbs up to indicate approval), reviews written by a customer, complaint forms filled out by a customer, information obtained from verbal interactions with customer (e.g., information derived from a transcript of a customer service call with a customer that is generated using, for example, voice recognition techniques) or any other types of communications from a customer to the organization or its related entity. According to some embodiments, the functions provided by the customer information database may also be provided by a database that is external to the discrepancy determination device 120, such as the database 118 as shown in FIG. 1.

As will be discussed further below (with reference to FIG. 3), the memory 230 may also include an event queue 260 for temporarily storing queued events and a command queue 270 for temporarily storing queued commands. The processor 210 may receive events from the event queue 260 and in response to processing the event using the rule-based platform 290 and/or the trained machine learning model 295, may generate zero or more commands to be output to the command queue 270. According to some embodiments, the discrepancy determination device 120 may place commands in the command queue 270 in the order they are generated. Each command may be designated to be executed by one or more devices, such as, for example, the web server 110, the call center server 112, the transaction server 114, the API server 122, or the NLP device 124 as shown in FIG. 1. Each such device (such as, for example, the API server 122 or NLP device 124) may continuously or intermittently monitor the command queue 270 to detect commands that are designated to be executed by the monitoring device and may access pertinent commands. The event queue 260 may receive events from other devices such as, for example, the user device 102, the web server 110, the call center server 112, the transaction server 114, the API server 122, and the NLP device 124 as shown in FIG. 1. According to some embodiments, events may be placed in the event queue 260 in a first-in first-out (FIFO) order, such that events may then processed by the discrepancy determination device 120 in the order they are received or generated.

The discrepancy determination device 120 may also be communicatively connected to one or more memory devices (e.g., databases) locally or through a network. The remote memory devices may be configured to store information and may be accessed and/or managed by the discrepancy determination device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The discrepancy determination device 120 may also include one or more I/O devices 220 that may comprise one or more interfaces for receiving signals or input from devices and providing signals or output to one or more devices that allow data to be received and/or transmitted by the discrepancy determination device 120. For example, the discrepancy determination device 120 may include interface components, which may provide interfaces to one or more input devices, such as one or more keyboards, mouse devices, touch screens, track pads, trackballs, scroll wheels, digital cameras, microphones, sensors, and the like, that enable the discrepancy determination device 120 to receive data from one or more users (such as, for example, via the user device 102).

In example embodiments of the disclosed technology, the discrepancy determination device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While the discrepancy determination device 120 has been described as one form for implementing the techniques described herein, other, functionally equivalent techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the discrepancy determination device 120 may include a greater or lesser number of components than those illustrated.

Figure 3:
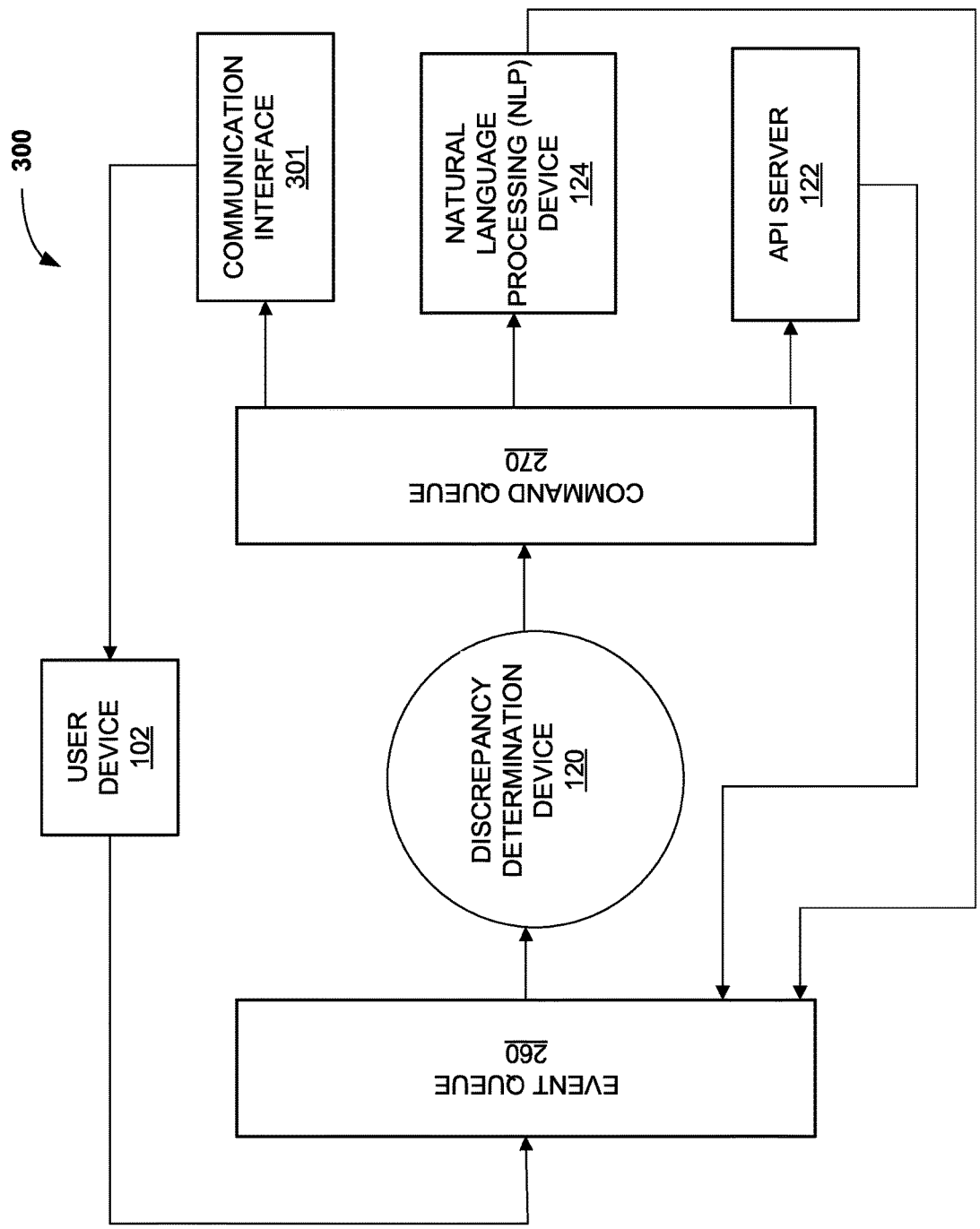
FIG. 3 is a block diagram 300 depicting functionality for autonomously determining and resolving a customer's perceived discrepancy during an automated customer service interaction, according to an example implementation of the disclosed technology.

FIG. 3 is a block diagram 300 depicting example system functionality for determining and responding to a customer's perceived discrepancy during an automated customer service interaction. In certain example implementations, the discrepancy determination device 120 may work in conjunction with the NLP device 124 via queues and feedback loops to: (a) autonomously interpret utterances/messages received from the user device 102; (b) gather information pertinent to the interpreted utterances/messages; and (c) program the NLP device 124 (via commands) throughout the interaction (s) that may ultimately lead to responding to a customer's perceived discrepancy, and in some instances, resolving the discrepancy. The methods disclosed herein may correspond to the block diagram 300 shown in FIG. 3, and may be performed by system 100 as discussed above and shown in FIG. 1 entirely or partially via the discrepancy determination device 120 using the processor 210 to execute memory 230 as shown in FIG. 2, and optionally with other steps delegated to other elements in system 100, such as the user device 102, the web server 110, the call center server 112, the transaction server 114, the API server 122, and/or the NLP device 124.

Responsive to receiving incoming customer messages from the user device 102 (and/or other events placed in the event queue 260), the discrepancy determination device 120 may generate and provide programming commands to the NLP device 124 via the command queue 270. The programming commands, for example, may cause the NLP device 124 to identify one or more candidate responses based on the interpreted contents of the incoming customer message. In certain implementations, a candidate response may be identified and output in the form of a specific response via the communication interface 301. In another example implementation, the candidate response may be identified and ultimately refined based on further information received from the discrepancy determination device 120 (such as order status, delivery proof, rules, etc.) and output as a meaningful response to the incoming customer message. In certain example implementations, the candidate response may be identified and a resolution to the perceived discrepancy may be initiated.

In certain example implementations, there can be a pre-established solution space from which responses or resolution measures may be generated. In certain example implementations, the generated response can be a natural-language construct including confirmations and/or corrections of verifiable assertions.

In certain example implementations, the discrepancy determination device 120 in conjunction with the NLP device 124 may be utilized to elicit additional information relevant to the initial message received from the customer when insufficient information is available to generate a candidate response. For example, the NLP device 124 may be instructed by the discrepancy determination device 120 to conduct additional dialogue with the customer (via the user device 102) to: elicit relevant missing information, generate specific information-eliciting utterances, acquire supporting evidence, acquire contrary evidence, abandon a candidate response, refine a candidate response, and/or commit to a response.

In certain example implementations, the NLP device 124 may be instructed by the discrepancy determination device 120 to generate and provide a response based solely on the initial message received from the customer, particularly if the initial message received includes verifiable assertions that can be processed by the discrepancy determination device 120.

In certain example implementations, the response may be output via the communication interface 301 in the form of textual, audible, and/or video information that is sent to the customer for display/output on the user device 102 associated with the customer. In other example implementations, a resolution to the perceived discrepancy may be output in the form of a refund, or an order for one or more products or services from a selected merchant for sending to the customer.

With continued reference to FIG. 3, a first event may be generated and placed in the event queue 260 in response to receiving a customer message. The event, for example, may be generated based on receiving a customer message sent via the user device 102. A customer message may be received via various communication mediums such as, for example, SMS, a voice-to-text device, a chat application, an instant messaging application, a mobile application, an IVR system, or any other such medium that may be sufficient to send and/or receive electronic communications. In some embodiments, the incoming message may be received by a device of the system 100, as discussed above with respect to FIG. 1, such as web server 110, call center server 112, API server 122, etc. An event may be generated by, for example, a RESTful API interfacing with the receiving device.

In certain example implementations, the event queue 260 may be configured to temporarily store a plurality of events. According to some embodiments, events are placed in the event queue in a first-in first-out (FIFO) manner, such that the events will be executed in the order that they were received. In some embodiments, the event queue 260 and/or the command queue 270 may be part of discrepancy determination device 120. In some embodiments, both the event queue 260 and the command queue 270 may be present on a device or component other than the discrepancy determination device 120. For example, in some examples, the event queue 260 and the command queue 270 may be maintained on a cloud server that is accessible by the discrepancy determination device 120, the API server 122, the NLP device 124, and/or the communication interface 301. According to some embodiments, an event may represent different types of information that can trigger or present an opportunity to respond to a received message.

According to some embodiments, the discrepancy determination device 120 may continuously or intermittently monitor the event queue 260. In response to detecting an event (e.g., the first event) in the event queue, the event may be received at the discrepancy determination device 120 from the event queue 260. In some embodiments, the discrepancy determination device 120 may include a rule-based platform, a trained machine learning model, and/or a database storing customer context/order information that may be derived from customer information associated with one or more customers that is stored in other database such as, for example, the database 118 and/or database 280 as discussed above with respect to FIG. 1 and/or FIG. 2. In some embodiments, the customer information may include one or more of account types, account statuses, transaction history, order status, delivery tracking status, proof of delivery, and conversation history. According to an example implementation of the disclosed technology, the customer context/order information may allow the system 100 to generate customized responses for one or more customers. According to some embodiments, the customer context/order information may be updated by the discrepancy determination device 120 upon receiving updated customer or order information from, for example, the database 118.

The discrepancy determination device 120 may, in response to processing the first event, generate a first command to be placed in a command queue 270. According to some embodiments, the discrepancy determination device 120 may generate a command based on the processed event and/or the customer context/order information using one or more of a rule-based platform 290 and a trained machine learning model 295, as discussed above with reference to FIG. 2. For example, in some use cases a command may be generated using the rule-based platform 290, whereas in other use cases, a command may be generated using the trained machine learning model 295, and further use cases may be handled by both working in concert. In some embodiments, the trained machine learning model 295 may be used as a way of enhancing the performance of the rule-based platform 290 by, for example, determining which rules have priority over other rules and what rules should be applied in a given context. According to some embodiments, the commands generated by the discrepancy determination device 120 in response to a particular event may change as the customer context/order information is updated over time. Further, changes to the rules in the rule-based platform 290 or further training of the machine learning model 295 may also result in different commands being generated in response to the same event based on previous results (e.g., successful resolution of a customer's issue).

According to some embodiments, and in reference to the discrepancy determination device discussed in FIG. 1, FIG. 2, and FIG. 3, the trained machine learning model 295 may be trained by updating an NLP database 174 (as discussed above with respect to FIG. 1) with communications from customers that have been labeled using, for example, a web user interface. The data in the NLP database 174 may undergo supervised training in a neural network model using a neural network training algorithm while the model is offline before being deployed in the system 100. According to some embodiments, an NLP model of the system 100 may utilize deep learning models such as a convolutional neural network (CNN) that transforms a word into a word vector and long short-term memory (LS™) that transforms a sequence of word vectors into intent. The NLP model may also be trained to recognize named entities in addition to intents. For example, a named entity may include persons, places, organizations, account types, and product types. According to some embodiments, when the discrepancy determination device 120 generates a command, such as a first command, it may determine an entity that will execute the command, such as, for example, the API server 122, the NLP device 124, a communication interface 301, or some other device or component, such that only the determined type of entity may pull the command from the command queue 270. For example, in the embodiment shown in FIG. 3, the discrepancy determination device 120 may determine that the first command is to be executed by the NLP device 124 in order to determine the meaning of the incoming customer message. According to some embodiments, at the time the discrepancy determination device 120 creates a new command, the discrepancy determination device 120 may also update the customer information database 280 (or alternatively, external database 118) with information about a previous or concurrent transaction or customer interaction.

In certain example implementations, the NLP device 124 may receive the first command from the command queue 270, execute the command, and generate a second event to be placed in the event queue 260. According to some embodiments, the NLP device 124 may continuously or intermittently monitor the command queue 270 to detect new commands and upon detecting a new command, may receive the command from the command queue 270. Upon receiving a command, the NLP device 124 may perform various functions depending on the nature of the command. For example, in some cases, NLP device 124 may determine the meaning of an incoming message in response to executing the command. According to some embodiments, NLP device 124 may determine the meaning of an incoming message and/or additional dialogue by utilizing one or more of the following artificial intelligence (AI) techniques: intent classification, named entity recognition, sentiment analysis, relation extraction, semantic role labeling, question analysis, rule extraction and discovery, and story understanding.

Intent classification may include mapping text, audio, video, or other media into an intent chosen from a set of intents, which represent what a customer is stating, uttering, requesting, commanding, asking, or promising in, for example, an incoming customer message. Intent classifications may include, for example, a request for an explanation for a perceived discrepancy, a request for a confirmation, an indication of satisfaction, or any other intent a customer may have in communicating a message. Named entity recognition may involve identifying named entities such as persons, places, organizations, account types, and product types in text, audio, video, or other media.

Sentiment analysis may involve mapping text, audio, video, or other media into an emotion chosen from a set of emotions. For example, a set of emotions may include positive, negative, anger, anticipation, disgust, distrust, fear, happiness, joy, sadness, surprise, and/or trust. Relation extraction may involve identifying relations between one or more named entities in text, audio, video, or other media. A relation may be for example, a "customer of" relation that indicates that a person is a customer of an organization. Semantic role labeling may involve identifying predicates along with roles that participants play in text, audio, video, or other media. An example of semantic role labeling may be identifying (1) the predicate Eat, (2) Tim, who plays the role of Agent, and (3) orange, which plays the role of Patient, in the sentence "Tim ate the orange." Question analysis may involve performing natural language analysis on a question, including syntactic parsing, intent classification, semantic role labeling, relation extraction, information extraction, classifying the type of question, and identifying what type of entity is being requested.

Rule extraction and discovery may involve extracting general inference rules in text, audio, video, or other media. An example of rule extraction may be extracting the rule that "When a person turns on a light, the light will light up" from "Matt turned on the light, but it didn't light up." Story understanding may involve taking a story and identifying story elements including (1) events, processes, and states, (2) goals, plans, intentions, needs, emotions, and moods of the speaker and characters in the story, (3) situations and scripts, and (4) themes, morals, and the point of the story.

In some cases, the NLP device 124 may perform natural language generation in response to receiving a command. According to some embodiments, the NLP device 124 may perform natural language generation by utilizing one or more of the following AI techniques: content determination, discourse structuring, referring expression generation, lexicalization, linguistic realization, explanation generation.

Content determination may involve deciding what content to present to the customer out of all the content that might be relevant. Discourse structuring may involve determining the order and level of detail in which content is expressed. Referring expression generation may involve generating expressions that refer to entities previously mentioned in a dialogue. Lexicalization may involve deciding what words and phrases to use to express a concept. Linguistic realization may involve determining what linguistic structures, such as grammatical constructions, to use to express an idea. Explanation generation may involve generating a humanly-understandable, transparent explanation of a conclusion, chain of reasoning, or result of a machine learning model. In the example embodiment shown in FIG. 3, the NLP device 124 may determine the meaning of the incoming customer message and convert it to a form that may be processed by the discrepancy determination device 120. Accordingly, the second event generated by the NLP device 124 may represent a determined meaning of the incoming customer dialogue message and the NLP device 124 may send the second event to the event queue 260.

The discrepancy determination device 120 may receive the second event from the event queue 260 in response to detecting it, as described above with respect to the discrepancy determination device's 120 receipt of the first event. In some embodiments, the discrepancy determination device 120 may also update the customer context/order information at this point by receiving updated customer information from, for example, the database 118. The discrepancy determination device 120 may, in response to processing the second event, generate a second command to be placed in a command queue 270. According to some embodiments, the discrepancy determination device 120 may generate the second command based on the processed event, the customer context/order information, and using one or more of a rule-based platform 290 and a trained machine learning model 295 as described above. In the example embodiment shown in FIG. 3, the second event may represent a customer's request to know, for example, why they were charged for shipping or why they received a product or service that did not meet their expectations. Based on the customer context/order information, the rule-based platform 290 and/or trained machine learning model 295, the discrepancy determination device 120 may decide, for example, using predictive analytics, that it has enough information to create a second event that represents instructions to an API associated with the API server 122 to look up order information related to the customer and/or policy information related to the order. However, in some embodiments, the discrepancy determination device 120 may decide that, for example, it requires more information and may instead create a second event that represents instructions to communication interface 301 to send a message to user device 102 requesting more information. Accordingly, based on the customer context/order information, the rule-based platform 290, and the trained machine learning model 295, the discrepancy determination device 120 may change or adapt its responses to a given request over time.

The discrepancy determination device 120 may, in response to processing the second event, generate a second command to be placed in command queue 270. According to some embodiments, the discrepancy determination device 120 may generate the second command based on the processed event, the customer context/order information, and using one or more of rule-based platform 290 and trained machine learning model 295 in a fashion similar to the generation of the first command described above. According to some embodiments, the second command may represent a command to the API server 122 to retrieve customer information, such as, for example, shipping amounts, order contents, delivery details, etc.

In some embodiments, the API server 122 may receive the second command from the command queue 270, execute the command, and generate a third event to be placed in the event queue 260. According to some embodiments, the API server 122 may continuously or intermittently monitor the command queue 270 to detect new commands and, upon detecting a new command, may receive the command from the command queue 270. Upon receiving a command, the API server 122 may perform various functions depending on the nature of the command. In some cases, the API server 122 may call up an API stored locally or remotely on another device, to retrieve customer/order data, perform an account action (e.g., initiate a refund), and/or respond with an explanation for the perceived discrepancy. Accordingly, the third event may represent, for example, retrieved information, an acknowledgement of the discrepancy, explanation for the perceived discrepancy, etc.

The discrepancy determination device 120 may receive the third event from the event queue 260 in response to detecting it as described above. In some embodiments, the discrepancy determination device 120 may also update the customer context/order information at this point by receiving updated customer information from, for example, the database 118.

The discrepancy determination device 120 may, in response to processing the third event, generate a third command to be placed in the command queue 270. According to some embodiments, the discrepancy determination device 120 may generate the third command based on the processed third event and/or the customer context/order information using one or more of the rule-based platform 290 and the trained machine learning model 295 in a fashion like the generation of the first command described above. In some embodiments, the discrepancy determination device 120 may also generate a response message in response to processing an event, such as the third event. In some embodiments, the discrepancy determination device 120 may receive a response message as an event produced by the NLP device 124. According to some embodiments, the third command may represent a command or instruction to the communication interface 301 to transmit the response dialogue message to, for example, the user device 102.

The communication interface 301 may receive and execute the third command, which may cause the communication interface 301 to transmit (e.g., via SMS) the response message to user device 102. In some embodiments, the communication interface 301 may continuously or intermittently monitor the command queue 270 for new commands and may receive the third command in response to detecting the third command in the command queue 270. According to some embodiments, the communication interface 301 may be a standalone device having some or all of the elements of the discrepancy determination device 120 as shown in FIG. 2. In some embodiments, the communication interface 301 may be integrated into discrepancy determination device 120 (e.g., as I/O device 220). In some embodiments, the communication interface 301 may be integrated into another device, such as, for example, the web server 110, the call center server 112, the transaction server 114, the API server 122, and/or the NLP device 124.

As shown in the example embodiments in FIG. 3 (and with implied reference to FIG. 1) the system 100 may autonomously exchange messages or conduct dialogue with a customer utilizing the structure provided by the event queue 260, the discrepancy determination device 120, the command queue 270, the API server 122, the NLP device 124, and the communication interface 301 to identify one or more triggers or opportunities to provide a response to the determined perceived discrepancy. That is, the system 100 may determine whether each event received by the discrepancy determination device 120 triggers a discrepancy determination process (e.g., by identifying one or more triggers) in addition to continuing a dialogue with the customer. As part of this process, the system 100 may adaptively respond to customer messages to leverage AI in the machine learning models and NLP device(s) to adaptively respond to customer communications using natural language before and/or after identifying triggers to provide a response. Further, repeatedly updating a customer context/order information may enable the system 100 to provide customized gestures to individual customers over time. Thus, in certain example implementations, by applying AI and/or machine-learning via the NLP device 124, and by repeatedly updating and maintaining the customer context/order information (i.e., by the discrepancy determination device 120) the system 100 may provide adaptive and/or customized gestures to individual customers based in part on their individual context. While FIG. 3 and the related description appear to show an example of a single cycle of events, it should be appreciated that multiple different cycles of events (with associated feedback) may be processed in parallel by the discrepancy determination device 120. In some embodiments, the API server 122, the NLP device 124, and the communication interface 301 may operate asynchronously, which may allow their independent operation, for example, by separately pulling commands from command queue 270. Accordingly, the entire system may be stateless with no side effects to calling a particular function.

Certain example implementations of the disclosed technology may include two types of input: one-sided, non-interactive communication received from a customer (such as utterances); and/or interactive, back-and-forth communication (such as a conversation) where a customer interacts with the automated system 100.

Certain example implementations of the disclosed technology may include solution spaces that are (A) constrained, with multiple-choice solutions, (B) constrained, with solutions selectable from the full solution space, and/or (C) unconstrained.

Figure 4:
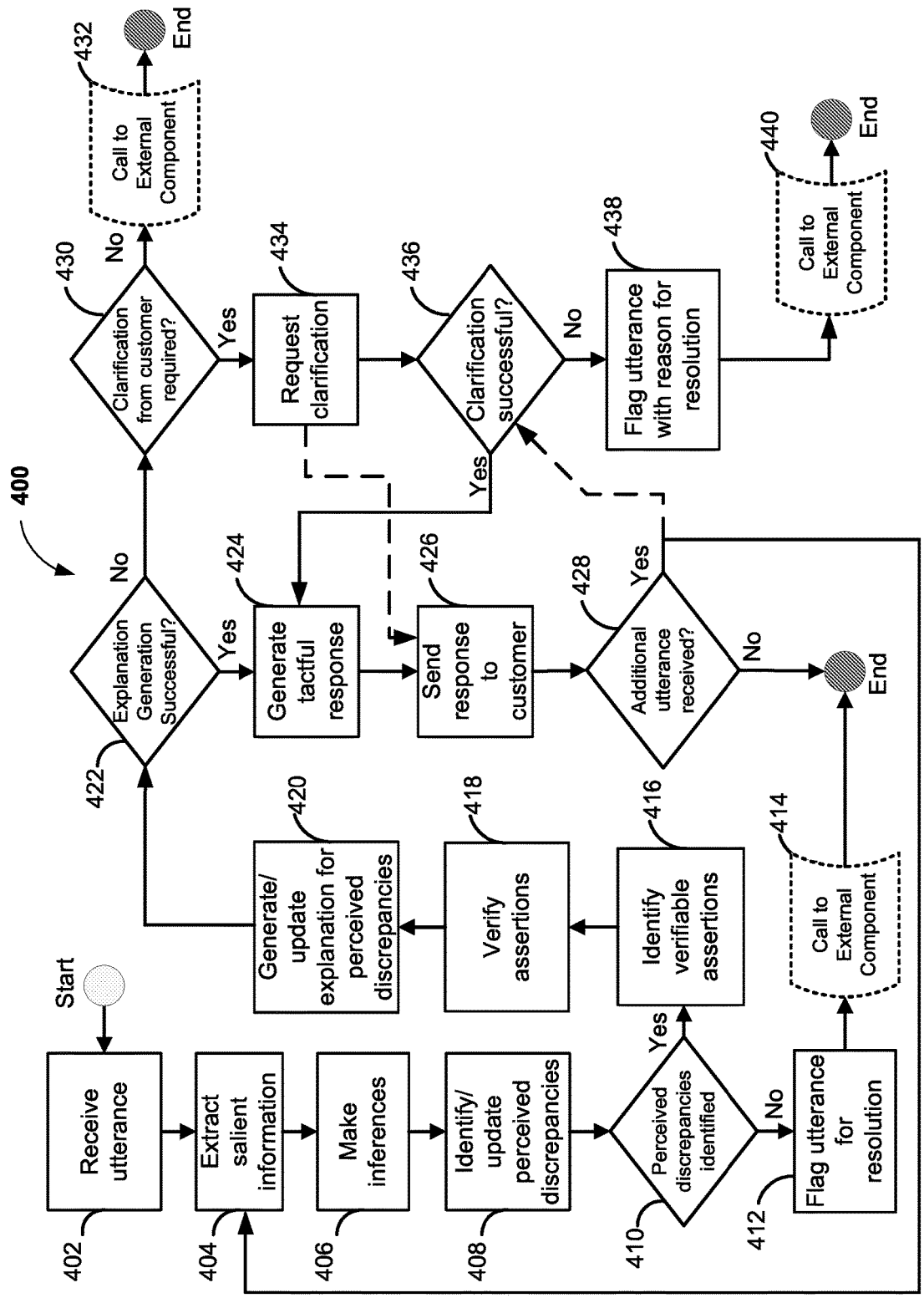
FIG. 4 is a flow diagram 400 illustrating examples of methods for determining and resolving a customer's perceived discrepancy during an automated customer service interaction, in accordance with certain embodiments of the disclosed technology.

FIG. 4 is a flow diagram 400 that illustrates certain example processes performed by the system 100, in accordance with certain embodiments of the disclosed technology. In block 402, the process can include receiving an utterance, for example, from a customer or from another component of the automated customer service system that has identified this utterance as potentially being within the scope of the discrepancy explanation system 100. In block 404, the process can include extracting salient information from the received utterance. For example, the salient information can include perceived states, expected states, desired states, arguments, other assertions, and/or other salient information (e.g., use of language that signals possible perceived discrepancies). However, not all of this salient information will necessarily be found in all utterances. In block 406, the process can include making inferences based on the extracted salient information, potentially producing/updating additional verifiable assertions, perceived states, expected states, desired states, other assertions, and/or argument components. Among the inferred information is that which is implied, rather than explicitly expressed, by the customer. In block 408, the process can include identifying (or updating) a perceived discrepancy (i.e., mismatches between expected states and perceived states). This can be done in various ways such as comparing extracted/inferred expected states to extracted/inferred perceived states and identifying mismatches between them; or identifying use of language that signals discrepancies (e.g., "This is different from what I expected"), and then identifying the mismatching states. Alternatively, the utterance may be identified as a follow-up utterance about a discrepancy introduced in a previous utterance.

At block 410, if no perceived discrepancies and/or other assertions have been identified, the utterance may be assessed as not being within the scope of the discrepancy explanation system, and the process may move to block 412 where the utterance may be flagged for resolution, and/or may be sent to an external system for resolution (e.g., to a human customer service representative), as depicted in optional block 414.

At block 410, if a perceived discrepancy can be identified, on the other hand, then the process may move to block 416 in which extracted verifiable assertions may be identified. If any of the assertions extracted from the perceived discrepancies (including any assertions in arguments) are identified as verifiable, the process may verify the assertions in block 418. Generally, assertions can be about facts or rules. Verifiable assertions are assertions that refer to information within the system's scope that can be accessed by the system to assess the truth value of assertions.

Once certain assertions are verified, the process can include generating or updating an explanation for the perceived discrepancies and/or other assertions in block 420. This can be done using various methods, including combinations of: matching the perceived discrepancy to an entry in a list of common perceived discrepancies; retrieving that discrepancy's explanation from the list; and adapting it to the particular customer's situation if necessary; extracting the explanation from a formal representation of facts and rules (e.g., a list of rules or a graph representing causality relationships); using theorem proving techniques to generate an argument supporting the perceived discrepancy or refuting the expected state; and/or using various AI techniques or combinations of AI techniques. If an argument was identified, for example, the system may address it in this explanation-generation step. The assertions of the argument and the reasoning of the argument may be identified (if these have not been identified already during previous steps), and the process may verify the assertions and the correctness of the reasoning. In certain implementations, only discrepancy reasons directly related to the argument may be included in the generated explanation.

In accordance with certain embodiments, if a discrepancy and/or assertion cannot be verified by the system, a fact pattern response may be generated (for example, in block 420) that can include any information known about the transaction related to the product or service. For example, a customer communication may include the following utterance: "Why was I charged $25 for shipping? I was only charged $7 on all my previous orders!" In this example case, there may be two assertions: (1) the customer was charged $25 for shipping; and (2) the customer's previous orders were only charged $7 for shipping. Based on the utterance, the system may determine that there is an $18 discrepancy between the expected and perceived state. The system may then attempt to verify the assertions/discrepancy by retrieving the customer's order history from a database. If, for example, the order history indicates that there were no $25 shipping charges on any previous orders associated with the customer, and that all previous orders were charged $7, the generated fact pattern response may reference the customer order history and provide a listing of recent orders, dates, shipping charges, etc. In this respect, the fact pattern response may provide information that will help the customer realize that they may have confused vendors.

At block 422, if the explanation generation is not successful, the process may move to decision block 430 where a determination can be made whether clarification from the customer is required or possibly beneficial. If not, the process may move to call an external component as depicted in optional block 432. Referring again to decision block 430, if it is determined that additional clarification may be helpful or required, the process may move to block 434 to request additional information, clarification, or verification from the customer. In decision block 436, if it is determined that the clarification was not successful, the process may move to block 438 and flag the utterance and the process may call an external component in optional block 440. In decision block 436, if the clarification is successful (and/or if the initial explanation generation was successful, per decision block 422) the process may move to block 424 where a tactful response is generated, and a response is sent to the customer in block 426. If no additional utterance is received, decision block 428 may end the process. If an additional utterance is received from the customer, the process may either return to block 404 to extract the salient information (and continue the above-described process) or, it may be determined that the customer has provided additional clarification and such clarification may be evaluated in decision block 436. After a response is provided to the customer, another customer utterance may be received. In that case, the process may continue as above until the conversation ends. If the system 100 is unable to explain a perceived discrepancy for any other reasons, the perceived discrepancy could be transferred to an external component at optional block 440 (e.g., another automated system and/or to a human agent for clarification and/or resolution).

In accordance with certain example implementations of the disclosed technology, the discrepancy determination device 120 may work in concert with the NLP device 124 (and other components of the system 100) to build a response using some or all of the processes described above, and the response can be sent to the customer. The response may contain confirmations of verifiable assertions that were assessed by the system as true or corrections of verifiable assertions that were assessed by the system as false. If, at any stage of this process, certain perceived discrepancies and/or other assertions are found not to be resolvable through the system's reasoning capabilities, e.g., a product was shipped in the wrong color or the e-commerce website is not loading, the system identifies and flags them so that they can be resolved by a separate component. If the system 100 cannot explain a perceived discrepancy because one or more of the involved assertions are not verifiable, the system may generate an appropriate response. The system 100, for example, may respond by asking the customer to rephrase the perceived discrepancy in terms of verifiable facts/rules. In certain implementations, the response may also contain additional requests for clarification before deciding upon any of the above.

In accordance with certain example implementations of the disclosed technology, tactful responses may be generated, for example, to avoid accusatory or inflammatory language, especially since the response may include corrections of what the customer has stated and explanations that could potentially generate additional friction by further contradicting the customer's expectations.

Figure 5:
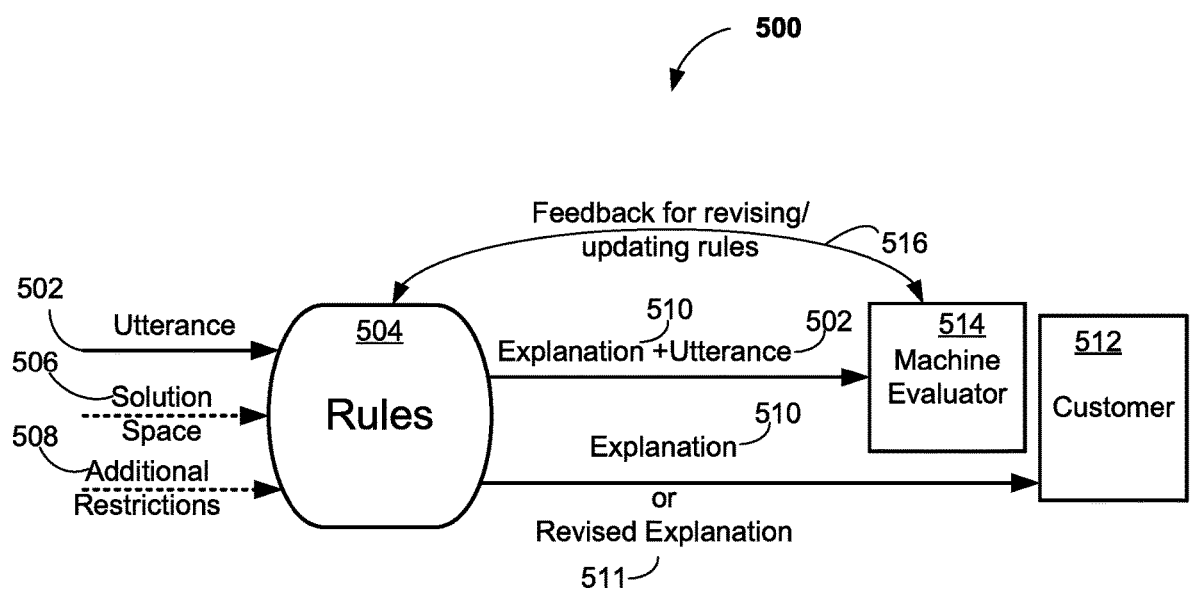
FIG. 5 is an input/output diagram 500 for autonomously evaluating and revising certain rules in the process of determining and resolving a customer's perceived discrepancy during an automated customer service interaction, in accordance with certain embodiments of the disclosed technology.

FIG. 5 is an input/output diagram 500 illustrating an example process for monitoring automated interactions with a customer and updating the rules 504 of the rules-based platform (such as the rules-based platform 290 as discussed above with respect to FIG. 2) in accordance with certain embodiments of the disclosed technology. The dashed lines represent optional input of the solution space 506 and/or additional restrictions 508. According to an example implementation of the disclosed technology, a received utterance 502 may be processed using rules 504 of the rules-based platform, and the system 100 may output to the customer 512 an explanation 510 for a perceived discrepancy. In certain example implementations, the explanation 510 and the utterance 502 may also be sent to a machine evaluator 514, which may analyze the explanation 510 in light of the utterance 502 and provide feedback 516 for revising the rules 504 or explanation 510.

In certain example implementations, the utterance 502 and (initial) explanation 510 may be presented to the machine evaluator 514 before an explanation is provided to the customer 512, so that a revised explanation 511 may be sent to the customer 512 based on updated rules 504. Throughout this process, utterances 502 can be targeted for obtaining further information for generating the explanation 510 or providing a revised explanation 511. In accordance with certain example implementations of the disclosed technology, the explanation 510 or revised explanation 511 may be provided to the customer 512 after the conversation/session has ended. According to an example implementation of the disclosed technology, the explanation 510 may be in the form of natural language.

Figure 6:
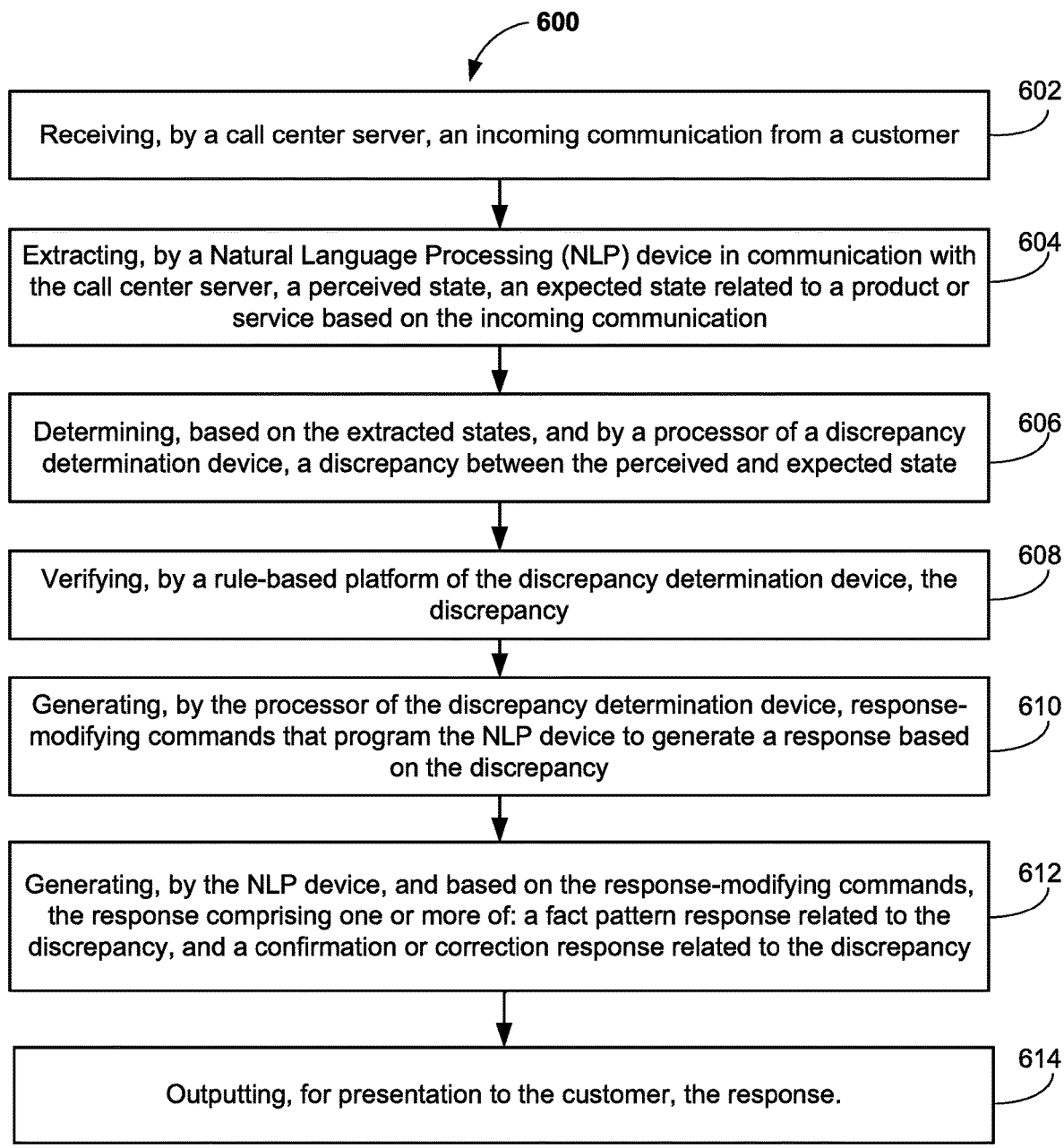
FIG. 6 is a flow chart of a method 600 for autonomously determining and resolving a customer's perceived discrepancy during a customer service interaction, in accordance with an example implementation of the disclosed technology.

FIG. 6 is a flow chart of a method 600 for autonomously determining and resolving a customer's perceived discrepancy during a customer service interaction, in accordance with an example implementation of the disclosed technology. In block 602, the method 600 includes receiving, by a call center server, an incoming communication from a customer. In block 604, the method 600 includes extracting, by a Natural Language Processing (NLP) device in communication with the call center server, a perceived state and an expected state related to a product or service based on the incoming communication. In block 606, the method 600 includes determining, based on the extracted states and by a processor of a discrepancy determination device, a discrepancy between the perceived state and the expected state. In block 608, the method 600 includes verifying, by a rule-based platform of the discrepancy determination device, the discrepancy. In block 610, the method 600 includes generating, by the processor of the discrepancy determination device, response-modifying commands that program the NLP device to generate a response based on the discrepancy.

In block 612, the method 600 includes generating, by the NLP device, and based on the response-modifying commands, the response comprising one or more of: a fact pattern response related to the discrepancy; and a confirmation or correction response related to the discrepancy and/or one or more assertions. In block 614, the method 600 includes outputting, for presentation to the customer, the response.

Certain implementations can further include extracting zero or more other assertions related to the product or service based on the incoming communication.

In certain implementations, the response may include one or more confirmations and/or corrections of verifiable assertions (if any) from the zero or more other extracted assertions. Certain implementations may further include generating, by a machine learning module of the discrepancy determination device, a resolution response based on the verifiable assertion(s). In some implementations, the resolution response can include an offer to resolve the discrepancy.

Certain implementations may further include generating, by a machine learning module, a response comprising a request for additional clarification. In some implementations the request for additional clarification may be based on one or more non-verifiable assertions or non-verifiable discrepancies.

In certain example implementations, generating the response can include generating an explanation for the discrepancy.

Certain implementations may further include refining one or more of the rule-based platform and a machine learning module based on intermediary process monitoring of the generated response.

Certain implementations may further include flagging the incoming communication for a call to an external component upon failure of the NLP device to generate one or more of the fact pattern response or confirmation/correction.

In some implementations, generating the response can include comparing the perceived discrepancy to an entry in a list of common perceived discrepancies, retrieving a corresponding explanation from the list, and adapting the response with the corresponding explanation.

Certain implementations may further include extracting, from the incoming communication, one or more verifiable assertions related to the product or service. Some implementations may include verifying, by a rule-based platform of the discrepancy determination device, the one or more verifiable assertions. In some implementations, generating the response-modifying commands may be further based on the one or more verifiable assertions.

Certain implementations may further include generating, based on information about the customer, specific information-eliciting communications for additional dialogue with the customer.

Certain implementations may further include one or more of: identifying relevant missing information related to the product—or—service; acquiring supporting evidence for the perceived discrepancy; acquiring contrary evidence for the perceived discrepancy; abandoning the response and accessing an external component; refining the response; and/or ordering a resolution on behalf of the customer.

In certain example implementations, the system may be utilized for determining and resolving a customer's perceived discrepancy during a customer service interaction. The system can include one or more processors; a discrepancy determination device; a rule-based platform; a Natural Language Processing (NLP) device; a machine learning module; and memory in communication with the one or more processors and storing instructions that, when executed by the one or more processors, cause the system to perform the method steps as describe above.

In certain implementations, the system may receive an incoming utterance from a customer; extract, by the NLP device, a perceived state, an expected state, and/or other assertions of a product or service based on the received utterance; determine, based on the extracted states, and by the discrepancy determination device, a discrepancy between the perceived and expected state of the product or service; verify, by a rule-based platform, the discrepancy and/or one or more assertions; generate, by the machine learning module, a response based on the discrepancy, the response comprising one or more of: a fact pattern response related to the perceived discrepancy; and a confirmation or correction of a verified discrepancy and/or verified assertion(s); refine one or more of the rule-based platform and the machine learning module based on intermediary process monitoring of the generated response; and output, for presentation to the customer, the generated response.

In some implementations, the instructions may further cause the system to generate, by the machine learning module, a resolution response based on the verified discrepancy, the resolution response comprising an offer to eliminate the discrepancy.

In certain example implementations, the instructions may further cause the system to generate, by the machine learning module, a response comprising a request for additional clarification based on a non-verifiable discrepancy and/or one or more non-verifiable assertions or other content from the user utterance.

In certain instances, the response can include an explanation for the discrepancy. In certain example implementations, the fact pattern response can include an explanation that no actual discrepancy was detected.

According to certain example implementations, the instructions may further cause the system to flag the utterance for a call to an external component upon failure of the machine learning module to generate a fact pattern response or confirmation/correction.

According to certain example implementations of the disclosed technology, the term "dialogue" as used herein may refer to information and/or communication received from a customer and/or provided to a customer as part of the interaction(s) between the customer and the intelligent system 100. In some implementations, such interactions may utilize certain communication channels (such as voice, e-mail, messaging, etc.) to exchange textual, audible and/or video information. Certain example implementations may utilize customer history records and/or records of communications with human customer service representatives to provide additional context for the interaction between the customer and the intelligent agent system. According to certain example implementations of the disclosed technology, the dialogue may be in the form of interactive (i.e., back-and-forth, two-way, conversation-like) communications between the customer and the intelligent system 100. In some implementations, the dialogue may be in the form of non-interactive (i.e., single-sided, one-way, story-like) communications. In certain example implementations, records of interactive and/or non-interactive communications conducted with the customer may be utilized. In certain implementations, such communication information may be obtained, for example, through a chat window, e-mail, phone call, etc., and/or recorded through textual, audible and/or video information channels.

In certain example implementations, the system 100 may execute instructions to conduct general dialogue with a customer to identify a first trigger of a predetermined plurality of triggers. Upon identifying the first trigger, the system 100 may generate one or more responses. Optionally, in some embodiments, the system may generate general information-eliciting utterances. Regardless of whether additional information is required, the system 100 may generate one or more candidate responses. Upon doing so, the system may identify relevant missing information and generate specific information-eliciting responses.

In accordance with certain example implementations, the systems and methods disclosed herein include virtual assistants that utilize machine learning and/or Artificial Intelligence (A.I.) systems to operate and interact with a customer without the need for a human customer service representative. It is frequently impossible for humans to perform the calculations performed by A.I. systems. For example, and as disclosed herein, the processing that the A.I. systems performs is often not pre-programmed and may vary depending on dynamic factors, such as the utterance input received, a time at which the input data set was processed, other input data previously processed, etc. For A.I. systems (such as those disclosed herein) that employ repeated or continuous learning, it may even be impossible to identify the particular algorithm(s) used to process a given input data set. These complexities indicate that A.I. systems are more than just a set of algorithms, but rather frameworks that are carefully designed in terms of input variables, hyperparameters, optimization variables, training data sets, validation data sets, etc. Certain algorithms may support and define a high-level A.I. framework but may or may not be the same algorithms that are used to process input data. In accordance with certain implementations of the disclosed technology, the machine-learning/A.I. framework disclosed herein performs a superior job (compared with a human) of identifying specific data-processing algorithms (e.g., in terms of machine-learning parameters). Thus, the A.I. system discussed herein may not utilize predefined computer algorithms and may extend well beyond mental processes and abstract ideas.

The technology disclosed herein typically involves a high-level design effort to construct a computational system that can appropriately process unpredictable data. Mathematical algorithms may be used as building blocks for a framework, however certain implementations of the system may autonomously learn its own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example Use Cases

In the context of a customer service interaction, a customer may order specific goods or services, but due to a misunderstanding or mistake, may receive the goods or services with some aspect that does not meet the customer's expectations. Often, such misunderstandings or mistakes will result in a discrepancy between what the customer expects, and what they receive. In some instances, a computer bug, outdated information, or miscommunication can cause the same type of mistake to happen to tens or thousands of customers, creating a customer service backlog that can be very expensive for an organization to resolve. The price for a particular product may be listed as $25 on the website, for example, but $30 in an inventory control system. Consequently, the organization may be inundated with customers requesting resolution, or at least an explanation regarding the discrepancy. The following example requests in the form of utterances may be received from customers who are seeking an explanation/resolution related to a shipping charge discrepancy: (a) "Why was I charged for shipping?"; (b) "What is this shipping charge for?"; (c) "I was charged for shipping. Why?"; (d) "Why was I charged $5 for shipping? I thought shipping would be free!"; (e) "Why was I charged for shipping on my order #123456789?"; (f) "I enrolled in your rewards program yesterday and should receive free one-day shipping for a year!"; (g) "Why was I charged $25 for shipping? I was only charged $7 on all my previous orders!"; etc.

To illustrate a specific example implementation of the disclosed technology, a customer utterance may be: "Why was I charged for shipping?" The systems and methods as disclosed here may be used to autonomously generate a response, such as: "Shipping fees are charged for the following reasons: [ . . . ], and waived only in these situations: [ . . . ]" This broad explanation could, however, be provided gradually, or the system could ask clarification questions in order to decide which of the multiple factors it should focus its explanation on.

For utterances that include an argument, an appropriate explanation would most likely need to address the argument directly. For example, a customer utterance may take the form: "Why was I charged for shipping? I spent more than $100!" The systems and methods as disclosed here may be used to autonomously generate a response, such as: "We no longer waive shipping fees for orders over $100. Only customers enrolled in our rewards program receive free shipping."

In certain example implementations, the systems and methods disclosed herein may generate a response including confirmations of verifiable assertions that were assessed by the system as true. For example, a customer utterance may take the form: "I ordered an olive-green T-shirt. I'd never order a navy blue one!" The systems and methods as disclosed here may be used to autonomously generate a response, such as: "Yes, I do see that you ordered this T-shirt in olive green."

In some implementations, the systems and methods disclosed herein may generate a response including corrections of verifiable assertions that were assessed by the system as being false. For example, a customer utterance may take the form: "Why was I charged for shipping on my order #123456789? I enrolled in the Gold Rewards program yesterday and should receive free one-day shipping for a year!" The systems and methods as disclosed here may be used to autonomously generate a response, such as: "I've checked your information and wanted to let you know that your current reward program tier is actually Silver [ . . . ]" Or, depending on the verifiable assertions and facts of the situation, the systems and methods as disclosed here may be used to autonomously generate a response, such as: "Your current rewards program provides you with free two-day shipping. For one-day shipping, you are charged a flat rate of $5."

In certain situations, the expected state is not necessarily the same as desired state. The distinction is exemplified by the following customer utterance: "I bought this T-shirt in size medium because you didn't have it in size large. I received a size 4 T-shirt, which is a small. Why?" In this case, the desired state is to receive a size-large T-shirt but the expected state is to receive a size-medium T-shirt, and the perceived state is having received a size-small T-shirt. Since there is a discrepancy between the expected and observed states, the systems and methods disclosed herein could acknowledge the discrepancy in the response and possibly take steps to remedy it. For the example above, the systems and methods could, in addition to providing explanations, connect to an external component (e.g., an inventory system) that can provide the customer with a size-large T-shirt, which had been the customer's initial choice.

The systems and methods disclosed herein may engage with the customer to establish common ground (e.g., resolve differences in terminology). For example, a customer utterance may take the form: "I enrolled in premium rewards yesterday! Why am I being charged shipping on the order I'm trying to place?" The systems and methods as disclosed here may be used to autonomously generate a response, such as: "Are you referring to the Gold Rewards tier?"

The systems and methods disclosed herein may make inferences from the extracted information, potentially producing/updating additional verifiable assertions, perceived states, expected states, desired states, other assertions, and/or argument components. Among the inferred information is that which is implied, rather than explicitly expressed, by the customer. For example, a customer utterance may take the form: "Why was I charged for shipping?" The customer only states their perceived state (that they were charged for shipping) explicitly, but the implied expected state is that they would not be charged for shipping. The systems and methods disclosed herein may be utilized to determine the implied state.

If certain perceived discrepancies and/or other assertions are found not to be resolvable through the system's reasoning capabilities, e.g., a product was shipped in the wrong color or the e-commerce website is not loading, the system identifies and flags them so that they can be resolved by a separate component (e.g., a human customer service representative). If the system cannot explain a perceived discrepancy because one or more of the involved assertions are not verifiable, the system may generate an appropriate response. If feasible and appropriate, it could, for example, encourage and assist the customer in rephrasing the perceived discrepancy in terms of verifiable facts/rules. For example, a customer utterance may take the form: "I expected this T-shirt to fit me well, but it doesn't!" (non-verifiable assertion). The systems and methods as disclosed here may be used to autonomously generate a response, such as: "Could you please let me know what size you ordered the T-shirt in?" (attempt to reformulate the perceived discrepancy in terms of verifiable assertions).

We claim:

1. A computer-implemented method for autonomously determining and resolving a customer's perceived discrepancy during a customer service interaction, the method comprising:
receiving, by a Natural Language Processing (NLP) device in communication with a discrepancy determination device processor, an incoming communication from a customer;
extracting, by the NLP device, a perceived state and an expected state related to a product or service based on the incoming communication;
acquiring supporting evidence or contrary evidence for the discrepancy;
autonomously determining, by the discrepancy determination device processor, a discrepancy between the perceived and expected state;
verifying, by a rule-based platform of the discrepancy determination device processor, the discrepancy;
extracting, from the incoming communication, one or more verifiable assertions related to the product or service;
verifying, by a rule-based platform of the discrepancy determination device, the one or more verifiable assertions;
generating, by the rule-based platform of the discrepancy determination device processor, response-modifying commands that program the NLP device to generate a response based on the discrepancy;
generating, by the NLP device, and based on the response-modifying commands, the response comprising one or more of:
the one or more verifiable assertions;
a fact pattern response related to the discrepancy; and
a confirmation or correction response related to the discrepancy;
autonomously outputting, for presentation to the customer, the response without involving a human customer service agent; and
ordering a resolution on behalf of the customer based at least in part on the supporting evidence.

2. The method of claim 1, wherein the response comprises the confirmation or correction response, the method further comprising:
generating, by a machine learning module of the discrepancy determination device, a resolution response, the resolution response comprising an offer to resolve the discrepancy.

3. The method of claim 1, wherein the response comprises the confirmation or correction response, the method further comprising:
generating, by a machine learning module, a response comprising a request for additional clarification based on a non-verifiable discrepancy.

4. The method of claim 1, wherein generating the response further comprises generating an explanation for the discrepancy.

5. The method of claim 1, further comprising:
refining one or more of the rule-based platform and a machine learning module based on intermediary process monitoring of the response.

6. The method of claim 1, further comprising:
flagging the incoming communication for a call to an external component upon failure of a system comprising the NLP device to generate one or more of the fact pattern response, confirmation, or correction.

7. The method of claim 1, wherein generating the response further comprises:
identifying the discrepancy in a list of common perceived discrepancies;
retrieving a corresponding explanation from the list; and
adapting the response with the corresponding explanation.

8. The method of claim 1, further comprising:
generating, based on information about the customer, specific information-eliciting communications for additional dialogue with the customer.

9. The method of claim 1, further comprising one or more of:
identifying relevant missing information related to the product or service;
abandoning the response and accessing an external component; or
refining the response.

10. A system for determining and resolving a customer's perceived discrepancy during a customer service interaction, the system comprising:
one or more processors;
a discrepancy determination device;
a rule-based platform;
a Natural Language Processing (NLP) device;
a machine learning module; and
memory in communication with the one or more processors and storing instructions that, when executed by the one or more processors, cause the system to:
receive an incoming communication from a customer;
extract, by the NLP device, a perceived state and an expected state of a product or service based on the incoming communication;
acquire supporting evidence or contrary evidence for the discrepancy;
autonomously determine, based on the perceived state and the expected state, and by the discrepancy determination device, a discrepancy between the perceived and expected state of the product or service;
verify, by a rule-based platform, the discrepancy;
extract, from the incoming communication, one or more verifiable assertions related to the product or service;
verify, by the rule-based platform, the one or more verifiable assertions;
generate, by the machine learning module, a response based on the discrepancy, the response comprising one or more of:
the one or more verifiable assertions;
a fact pattern response related to the perceived discrepancy; and
a confirmation or correction of the discrepancy;

refine one or more of the rule-based platform and the machine learning module based on intermediary process monitoring of the response;

autonomously output, for presentation to the customer, the response; and order a resolution on behalf of the customer based at least in part on the supporting evidence.

11. The system of claim 10, wherein the instructions further cause the system to generate, by the machine learning module, a resolution response based on the discrepancy, the resolution response comprising an offer to eliminate the discrepancy.

12. The system of claim 10, wherein the instructions further cause the system to generate, by the machine learning module, a response comprising a request for additional clarification based on a non-verifiable discrepancy.

13. The system of claim 10, wherein the response comprises an explanation for the discrepancy.

14. The system of claim 10, wherein the fact pattern response comprises an explanation that there was no actual detected discrepancy.

15. The system of claim 10, wherein the instructions further cause the system to flag the incoming communication for a call to an external component upon failure of the system to generate one or more of a fact pattern response, a confirmation, or a correction.

16. The system of claim 10, wherein the response is generated responsive to:

comparing the discrepancy to an entry in a list of common perceived discrepancies;

retrieving a corresponding explanation from the list; and adapting the response to relate to the incoming communication.

17. The system of claim 10, wherein the instructions further cause the system to extract and make use of, from the incoming communication, one or more of: an assertion, a desired state, an observed state, and an argument for why the perceived state is incorrect and the expected state is correct.

18. The system of claim 10, wherein the instructions further cause the system to generate, based on information about the customer, specific information-eliciting communications for additional dialogue with the customer.

19. The system of claim 10, wherein the instructions further cause the system to perform one or more of:

identify relevant missing information related to the product or service;

abandon the response and access an external component; or refine the response.

* * * * *